United States Patent
Hofmann et al.

(10) Patent No.: US 11,624,403 B2
(45) Date of Patent: Apr. 11, 2023

(54) METHOD FOR PRODUCING A ROLLING BEARING RING HAVING AN IMPROVED ROBUSTNESS AGAINST THE FORMATION OF WHITE ETCHING CRACKS (WEC)

(71) Applicant: SCHAEFFLER TECHNOLOGIES AG & CO. KG, Herzogenaurach (DE)

(72) Inventors: Lothar Hofmann, Neumarkt (DE); Andreas Mangold, Mellrichstadt (DE); Toni Blass, Bergrheinfeld (DE); Wolfram Kruhoeffer, Aurachtal (DE); Werner Trojahn, Niederwerrn (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 209 days.

(21) Appl. No.: 16/347,309

(22) PCT Filed: Nov. 7, 2017

(86) PCT No.: PCT/DE2017/100943
§ 371 (c)(1),
(2) Date: May 3, 2019

(87) PCT Pub. No.: WO2018/086658
PCT Pub. Date: May 17, 2018

(65) Prior Publication Data
US 2020/0300303 A1    Sep. 24, 2020

(30) Foreign Application Priority Data
Nov. 9, 2016    (DE) .......................... 102016221993.6

(51) Int. Cl.
*F16C 33/62* (2006.01)
*C21D 1/10* (2006.01)
(Continued)

(52) U.S. Cl.
CPC .............. *F16C 33/62* (2013.01); *C21D 1/10* (2013.01); *C21D 6/004* (2013.01); *C21D 6/005* (2013.01);
(Continued)

(58) Field of Classification Search
None
See application file for complete search history.

(56) References Cited

U.S. PATENT DOCUMENTS

2010/0296764 A1    11/2010    Strandell et al.

FOREIGN PATENT DOCUMENTS

| CN | 101868558 | 10/2010 |
| CN | 104232875 A | 12/2014 |

(Continued)

OTHER PUBLICATIONS

English language machine translation of JP200903526 to Takio. Generated Mar. 23, 2021. (Year: 2021).*
(Continued)

*Primary Examiner* — Brian D Walck

(57) ABSTRACT

The invention relates to a method for producing a rolling bearing ring featuring an improved robustness against the formation of white etching cracks (WEC), wherein the rolling bearing component, which is made of a hypo-eutectoid heat-treated steel containing C in an amount of 0.4-0.55% and Cr in an amount of 0.5-2.0% in order to form a hardened boundary layer, is inductively heated, then quenched and subsequently tempered.

7 Claims, 1 Drawing Sheet

(51) Int. Cl.
| | |
|---|---|
| *C21D 6/00* | (2006.01) |
| *C21D 9/40* | (2006.01) |
| *C22C 38/00* | (2006.01) |
| *C22C 38/02* | (2006.01) |
| *C22C 38/04* | (2006.01) |
| *C22C 38/06* | (2006.01) |
| *C22C 38/42* | (2006.01) |
| *C22C 38/44* | (2006.01) |

(52) U.S. Cl.
CPC ............... *C21D 6/008* (2013.01); *C21D 9/40* (2013.01); *C22C 38/002* (2013.01); *C22C 38/02* (2013.01); *C22C 38/04* (2013.01); *C22C 38/06* (2013.01); *C22C 38/42* (2013.01); *C22C 38/44* (2013.01); *F16C 2204/64* (2013.01)

(56) References Cited

FOREIGN PATENT DOCUMENTS

| | | |
|---|---|---|
| DE | 102005060113 A1 | 7/2006 |
| EP | 2123779 A1 | 11/2009 |
| EP | 2573195 A1 | 3/2013 |
| IN | 201917001195 | 11/2020 |
| JP | 2001220643 A * | 10/2001 |
| JP | 2009203526 A | 9/2009 |
| WO | 2015199599 A1 | 12/2015 |

OTHER PUBLICATIONS

English language machine translation of JP-2001220643-A to Hiramatsu. Generated Mar. 23, 2021. (Year: 2021).*

Vander Voort, G.F. "Martensitic Structures." ASM Handbook, vol. 9: Metallography and Microstructures. pp. 165-178. 2004. (Year: 2004).*

Sahay, Satyam. "Annealing of Steel." ASM Handbook, vol. 4A, Steel Heat Treating Fundamentals and Processes. pp. 289-304. 2013. (Year: 2013).*

Saarstahl, "Material Specification Sheet Saarstahl—42CrMo4—42CrMoS4", Internet Citation, Jun. 1, 2010, XP002677711, Website: hhtp://www.saarstahl.com/fileadmin/saarstahl_extranet/images/04_produkte/walzstahlsorten/deutch/7225_7227_42CrMo4_42CrMoS4.pdf, Downloaded: Jun. 14, 2012, 1 page.

Spiekermann, "Alloys—a special problem of patent law", XP-002184689, 20 pages.

International Search Report for International Application No. PCT/DE2017/100943 dated Jan. 22, 2018.

* cited by examiner

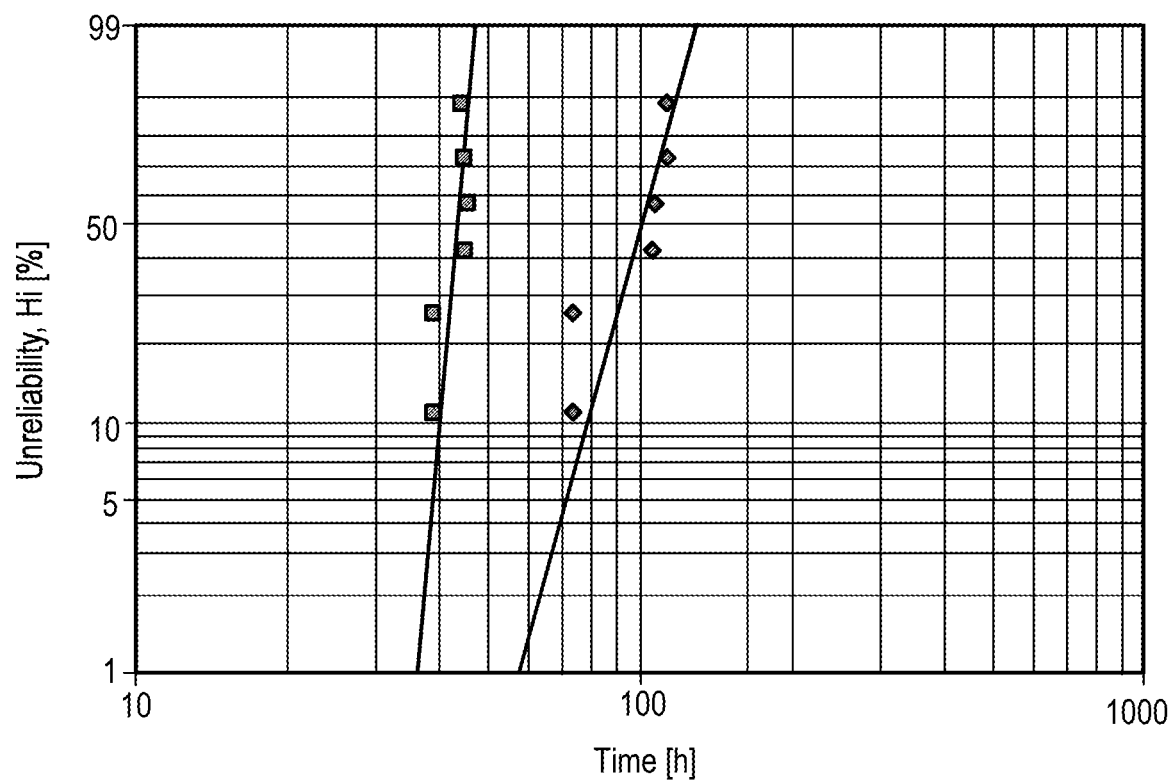

METHOD FOR PRODUCING A ROLLING BEARING RING HAVING AN IMPROVED ROBUSTNESS AGAINST THE FORMATION OF WHITE ETCHING CRACKS (WEC)

CROSS-REFERENCE TO RELATED APPLICATIONS

This application is the U.S. National Phase of PCT/DE2017/100943 filed Nov. 7, 2017, which claims priority to DE 102016221993.6 filed Nov. 9, 2016, the entire disclosures of which are incorporated by reference herein.

TECHNICAL FIELD

The disclosure relates to a method for producing a rolling bearing ring with an improved robustness against the formation of white etching cracks (WEC).

BACKGROUND

Rolling bearings are used in a wide range of applications, for example, in the automotive sector or for industrial equipment or machinery, and the like. In addition to the typical stress, or the rolling over the bearing rings by the rolling elements and the therein associated Hertzian squeeze or the Hertzian contact, the stress on such a bearing often includes an additional stress, which could often refer to e.g. a strong mixed friction or an electric or dynamic electricity or the like. In the particular case of an application in which such an additional stress is present, damages at such rolling bearings or at the rolling bearing components in the form of so-called white etching cracks (WEC) have sometimes been observed. These white etching cracks can firstly be encountered as structural changes in the material of the affected rolling bearing component. The structural change takes place below the bearing surface, i.e. below the surface that is exposed to the stress. In the further course, micro-cracks can form under the influence of external stress and these can extend up to the surface. The micro-cracks thereby lead to the typical WEC damage symptoms in the form of axial cracks or delaminations, preferably in the area of the running track of the component that is exposed to the stress, for example, an inner or outer ring of the rolling bearing. In extreme cases, when there is an advanced progression of the damage, it may even lead to a tearing or breaking of the rolling bearing ring and thus to a premature breakdown of the bearing.

The damage mechanism that leads to the formation of such of such WEC is still not conclusively established. However, it is assumed that the additional stress leads to a release of hydrogen from the lubricant system, via which the rolling bearing is lubricated. In the structure of the rolling bearing material, or of the steel, this hydrogen most likely leads to a conversion of martensitic and/or bainitic structures to amorphous or nano-crystalline ferrite with forcibly dissolved carbon or dissolved carbide structures.

It is known from the EP 2 123 779 A1, that a mechanically stressed bearing component is made of a hardened steel with a carbon content that is ranging between 0.4 and 0.8 percent by weight. However, the through hardening is limited to a particular cross-section in dependence of e.g. the content of alloying elements that increase the hardenability. Moreover, this technology cannot be used if the component is to feature a high level of toughness in the core after the hardening.

From the EP 2 573 195 A1, a method for producing a rolling bearing component is known, in which the rolling bearing component is heated up to a temperature between 100-200° C. for a period of 5-120 min, during which time it comes into contact with a chemical additive in the area of the running track in order to form a running track surface layer that is changed in a local surface area. To provide such a chemical additive, a conservation or a transmission oil with a water content of up to 500 ppm can be used. However, such a surface modification is only effective against the formation of WEC, as long as it is not rubbed off during operation. Thus, the use of such components, especially in applications that are used in a polluted environment and/or with a high proportion of mixed friction, is only possible to a limited extent.

The WO2015/199 599 A1 describes a method for the surface hardening of a metal component that includes the steps of induction hardening and a subsequent tempering.

It will be similar if special coatings are applied or if a burnished layer is formed on the running track surfaces, or on the areas of the components that are exposed to the stress. These could possibly lose their function if they are worn off.

This disclosure is thus based on an objective to provide a method that enables the production of a rolling bearing ring which is featuring an improved robustness against the formation of white etching cracks.

DETAILED DESCRIPTION OF THE DRAWINGS

To solve this problem, a method is intended in accordance with this disclosure, in which the rolling bearing ring that is made up of a hypo-eutectoid heat-treated steel containing C in an amount of 0.4-0.55% and Cr in an amount of 0.5-2.0% in order to form a hardened boundary layer, is inductively heated, then quenched and subsequently tempered.

On the one hand, the method according to this disclosure intends the use of a special source material, i.e. a hypo-eutectoid heat-tempered steel, and on the other hand, the implementation of defined hardening and temperature treatment steps, which lead to the formation of a hardened boundary layer.

For the steel, a hypo-eutectoid heat-tempered steel with a carbon content in the range of 0.4-0.55% and a chromium content in the range of 0.5-2.0% is used in accordance with the disclosure. Such a hypo-eutectoid heat-tempered steel is thereby hardened exclusively on the edge-sides via an inductive hardening procedure, so that an induction hardened boundary layer is formed. In its hardened state, this hypo-eutectoid heat-tempered steel does not contain any undissolved carbides in the hardened boundary layer area. A quenching of the rolling bearing component (hardening), with a subsequent step of tempering is carried out after the induction heating. Smallest tempered carbides (Fe2C) are formed via the tempering, the size of which is significantly smaller than 1 μm.

Due to the inductive hardening of the boundary layer, very high residual compressive stresses are present in the boundary layer, which present a certain barrier effect for hydrogen, which is considered to be the cause of the formation of the WEC. This means that despite the given additional stress and the thereby possibly resulting formation of hydrogen, it cannot diffuse into the structure, via which a rolling bearing ring that is produced in this manner, has proven to be extremely robust against the formation of WEC. Another advantage of the high-pressure residual stresses that result from the inductive hardening is, that they overcompensate the resulting tensile strain fields when the bearing is rolled over, so that an accumulation of hydrogen is also inhibited in these areas. Due to the high residual compressive stresses, the absolute concentration of hydrogen and thus the harmful influence in accordance with the amount of the rolling over is ultimately reduced significantly.

The heating can be carried out in an evenly distributed manner over the surface that is to be hardened or via the feed motion method. For the feed motion method, the electrical power which is required for the heating is controlled in such a way, that a re-heating does not occur on reaching an area that has already been hardened, the quenching is also carried out via a spraying in feed motion.

In contrast to typical, through-hardened rolling bearing steels such as e.g. from the 1000r6-family, the structure beneath the hardened boundary layer of the rolling bearing ring according to the disclosure does not consist of plate martensite, but of lath martensite. This structure ensures the compliance and thus the achieving of the required mechanical characteristics of the rolling bearing component, combined with a hardened and robust boundary layer.

The production is significantly simplified, as only one inductive boundary layer hardening is carried out, which can be carried out much faster than a complete through-hardening. Also, the application of special coatings or the production of a surface-modified running track surface and the like, as it is provided in the prior art, is not required, due to which the rolling bearing component can be produced in a very simple and quick manner.

According to an embodiment, the used heat-tempered steel may feature a Ni-content in the range of 0.5 to 1.0%. The hypo-eutectoid heat-tempered steel thus features a defined, relatively high Ni-content. This Ni-content leads to an increase in the toughness and thus to a further improvement of the achievable mechanical characteristics. At the same time, via the increasing of the Ni-content, it is possible to reduce the C content to some extent, which is additionally advantageous in that, as it was stated, there are no undissolved carbides in the hardened state.

It may be beneficial to use a heat-tempered steel on the basis of 50CrMo4 with a Ni-content ranging between 0.5 and 1.0%. Compared to the known heat-tempered steel 50CrMo4, whose C-content ranges between 0.46 and 0.54%, the C-content is slightly lower due to the Ni-content. This means that it is contemplated to use a heat-tempered steel with the following composition (data in %):

C: <0.46
Si: max. 0.4
Mn: 0.5-0.8
P: max. 0.035
S: max. 0.03
Cr: 0.9-1.2
Mo: 0.15-0.3
Ni: 0.5-1.0.

In a specific design example in line with this disclosure, a heat-tempered steel with the following composition (data in %) is contemplated:

C: 0.45
Si: 0.23
Mn: 0.64
P: 0.004
S: 0.001
Cr: 1.18
Mo: 0.28
Ni: 0.75
Cu: 0.12
Al: 0.02
as well as a rest of iron and trace elements.

In accordance with a further development of the method in line with this disclosure, it can be intended that the inductive heating is carried out in such a way, that a hardened boundary layer ranging from at least 0.2 mm thickness to up to a max. of 8 mm thickness is formed. Of course, the thickness of the boundary layer depends on the dimensioning of the rolling bearing ring. The inductive boundary layer hardening is carried out at pre-hardened steels in particular for larger cross-sections or larger components and thus with bigger boundary layer hardening depth, but a hardening from a normally annealed structure or the GKZ-state possible (GKZ=annealing on globular cementite).

The inductive heating is carried out at a frequency of 8-11 kHz, in particular of 9-10 kHz for a duration of 3-10 s, in particular 4-7 s. A hardening at 9.9 kHz for 5 s is carried out in one example.

The inductive hardening leads to high residual compressive stresses that form in the hardened boundary area. The hardening should be carried out in such a way in accordance with the disclosure, that a residual compressive stress of at least 300 MPa, or considerably more than that is provided in the hardened boundary area. With the increasing residual compressive stress, the barrier effect of the boundary layer against a hydrogen diffusion is increased.

The tempering, which leads to the formation of the tempered carbides, should be carried out at a temperature ranging from 120-160° C., in particular from 130-150° C. for a duration of 1-4 h, in particular 2-3 h according to one embodiment. The tempering can be carried out at a temperature of 140° C. for 2 h. The quenching that is preceding the tempering takes place in a suitable quenching liquid.

In addition to the method itself, this disclosure further relates to a rolling bearing ring, which is manufactured in accordance with the method in line with this disclosure. It consists of a hypo-eutectoid heat-tempered steel containing C in an amount of 0.4-0.55% and Cr in an amount of 0.5-2.0% with a hardened boundary layer that is formed via inductive hardening.

In a further development of the disclosure, the rolling bearing ring may be made of a heat-tempered steel on the basis of 50CrMo4 with an Ni-content in the range of 0.5-1.0%. It can feature the following composition (figures in %):

C: 0.45
Si: 0.23
Mn: 0.64
P: 0.004
S: 0.001
Cr: 1.18
Mo: 0.28
Ni: 0.75
Cu: 0.12
Al: 0.02
as well as a rest of iron and trace elements.

Six respective axial bearings consisting of two respective axial washers were manufactured.

A first batch made of six axial bearings was manufactured from a commercially available 1000r6-steel with the following production course:

Forging-tempering-turning-martensitic hardening-quenching-tempering-grinding-honing.

A second batch of six bearings was manufactured in the manner according to the disclosure from a hypo-eutectoid heat-tempered steel featuring the following composition:

C: 0.45
Si: 0.23
Mn: 0.64
P: 0.004

S: 0.001
Cr: 1.18
Mo: 0.28
Ni: 0.75
Cu: 0.12
Al: 0.02
as well as a rest of iron and trace elements (figures in %).

The manufacturing course of this hypo-eutectoid heat-tempered steel that was modified on the basis of 50CrMo4 is as follows:

Forging-GKZ annealing-turning-inductive boundary layer hardening-tempering-grinding-honing.

The inductive hardening was carried out via a frequency of 9.9 kHz for a heating period of 5 s. The quenching was carried out in a quench bath that is available under the trade name "Aquatensid-BW" at room temperature. The tempering was carried out at 140° C. for 2 h.

The bearings were made up of two respective axial bearing discs with an outer diameter of 95 mm and an inner diameter of 60 mm. The rolling elements were ceramic cylindrical rollers with a length of 11 mm and a diameter of 11 mm. They were guided in a cage.

The examination of the life span was carried out according to the specifications in accordance with the DIN51819-1, but at a revolution of 750 rpm, a stress of 60 kN (2075 MPa) and with the presence of a special, WEC-producing oil. In each case, two rolling bearings of the same type were examined, i.e. two respective bearings of the modified 50CrMo4 according to the disclosure, or two respective bearings of the previously used 100Cr6.

The obtained results are presented in the table below.

| Bearing no. | 100Cr6 Duration in h | 50CrMo4 Duration in h |
|---|---|---|
| 1 | 39 | 74 |
| 2 | 39 | 74 |
| 3 | 45 | 106 |
| 4 | 45 | 106 |
| 5 | 45 | 114 |
| 6 | 45 | 114 |

For each bearing it was determined in standardized test runs that were carried out until there was a breakdown, or the time period until the bearing could no longer be used due to an operational failure, whether that was a detected macroscopic damage, or whether these were detected WEC.

By using the Ni-containing hypo-eutectoid heat-tempered steel according to this disclosure in conjunction with the manufacturing course in line with the disclosure or respectively, in particular, in line with the inductive boundary layer hardening, a considerable improvement in the life span could be achieved when compared to the martensitic axial bearing discs that are made of 100Cr6. This results in an increase in the life span of more than a factor of 2, as it can be derived from a comparison of the average life span durations. For bearings that are made of 100Cr6, an average life span of 43 h could be determined for all 6 bearings, whereas for the bearings according to the invention, an average life span of 98 h could be achieved, which is more than twice of the time.

The carried out comparative examinations indicate that the method according to the disclosure or the rolling bearing component according to the disclosure provides a significant improvement in the robustness against the formation of WEC.

This is also shown by the Weibull-representation of the measured values as it is depicted in the drawing. Along the abscissa, the life span is marked down, i.e. the operating duration until there is a breakdown, and along the ordinate, the so-called unreliability value is marked down, which indicates the probability of a breakdown Hi in percent, in a respectively logarithmic manner. The Weibull-distribution represents a general distribution.

The cumulative frequency Hi is determined as follows:

$$Hi=(i-0,3):(n+0,4)$$

with:
i=ordinal number of the breakdown (in this case: 1 . . . 6)
n=number of samples (in this case: 6)

The measured values that are represented as squares (■) indicate the values for the rolling bearings or for the axial discs that are made of 100Cr6. The diamond-shaped symbols (♦) indicate the measured values for the rolling bearing components or for the axial discs according to this disclosure. A respective fitting line is also indicated.

It should be understood that references to a percent (%), such as composition percentage (%), refers to a percentage by mass.

The invention claimed is:

1. A method for producing a rolling bearing ring, wherein the rolling bearing ring, which is made of a hypo-eutectoid heat-treated steel containing:
   C: 0.45% by mass;
   Si: 0.23% by mass;
   Mn: 0.64% by mass;
   P: 0.004% by mass;
   S: 0.001% by mass;
   Cr: 1.18% by mass;
   Mo: 0.28% by mass;
   Ni: 0.75% by mass;
   Cu: 0.12% by mass;
   Al: 0.02% by mass;
   as well as a rest of iron and trace elements in order to form a hardened boundary layer, is inductively heated, then quenched and subsequently tempered, wherein the inductive heating is carried out at a frequency of 9-10 kHz, for a period of 4-7 s, wherein the hardened boundary layer lacks undissolved carbides after quenching and during tempering carbides are formed having a size less than 1 μm, wherein the tempering is carried out at a temperature ranging from 130-150° C. for a duration of 2-3 h, wherein a residual compressive stress of at least 300 MPa is provided in the hardened boundary layer, and
   wherein a structure beneath the hardened boundary layer consists of lath martensite.

2. The method according to claim 1, wherein the hardened boundary layer has a thickness ranging from at least 0.2 mm thickness to up to a maximum of 8 mm.

3. A method of producing a rolling bearing ring for a rolling bearing, the method comprising:
   producing a rolling bearing ring having a steel containing:
   C: 0.45% by mass;
   Si: 0.23% by mass;
   Mn: 0.64% by mass;
   P: 0.004% by mass;
   S: 0.001% by mass;
   Cr: 1.18% by mass;
   Mo: 0.28% by mass;
   Ni: 0.75% by mass;
   Cu: 0.12% by mass;
   Al: 0.02% by mass;

as well as a rest of iron and trace elements;
inductively heating the steel at a frequency of 8-11 kHz for a period of 3-10 s; and
then quenching and tempering the steel to form a hypoeutectoid heat-treated steel with a hardened boundary layer,
wherein the hardened boundary layer lacks undissolved carbides after quenching and during tempering carbides are formed having a size less than 1 µm;
wherein the tempering is carried out at a temperature ranging from 120-180° C. for a duration of 1-4 h, wherein a residual compressive stress of at least 300 MPa is provided in the hardened boundary layer;
wherein a structure beneath the hardened boundary layer consists of lath martensite.

4. The method of claim 3, wherein the step of inductively heating is performed at a frequency 9-10 kHz.

5. The method of claim 3, wherein the step of inductively heating is performed for a period of 4-7 s.

6. The method of claim 3, wherein the tempering is carried out at a temperature ranging from 130-150° C.

7. The method of claim 3, wherein the tempering is carried out for a duration of 2-3 hours.

* * * * *